Nov. 23, 1965  C. O. SCHMIDT, JR., ETAL  3,218,667
APPARATUS FOR BLEEDING
Original Filed April 13, 1962  5 Sheets-Sheet 1
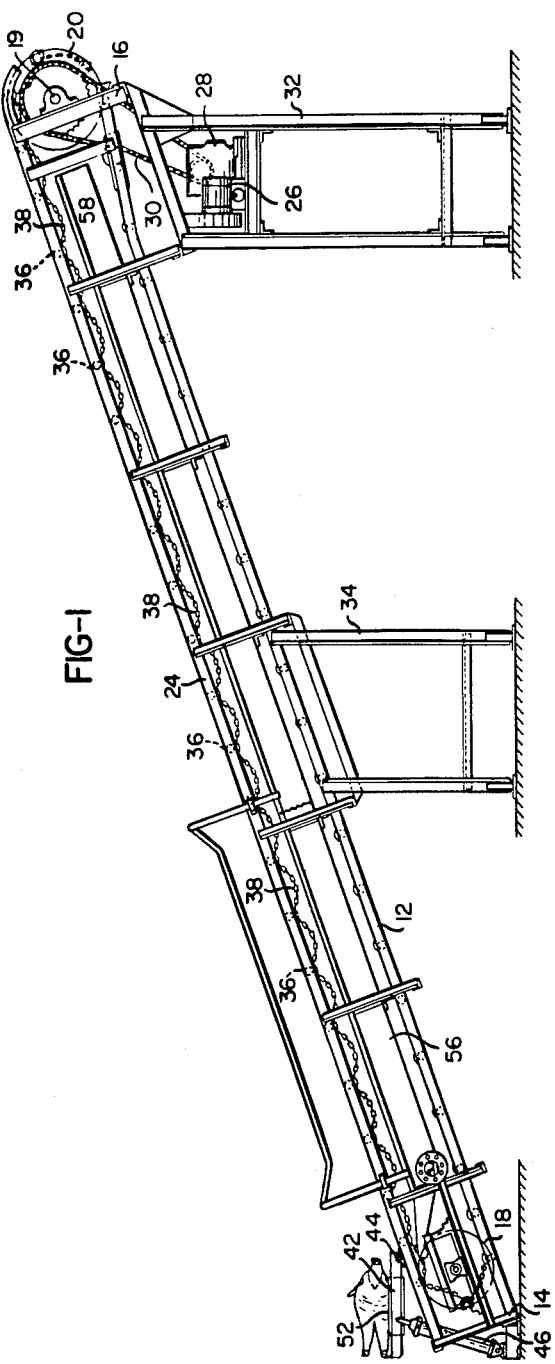
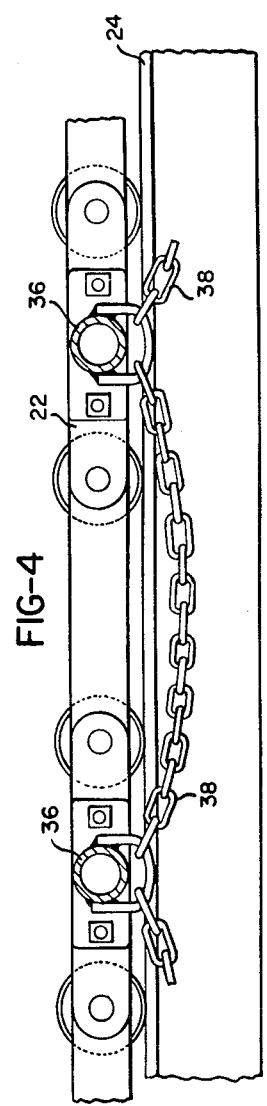
INVENTORS
CARL OSCAR SCHMIDT, JR.
FREDERICK A. ZAENKERT
BY CHARLEY E. WATSON
*JWarrenKinney Jr*
ATTORNEY Nov. 23, 1965 C. O. SCHMIDT, JR., ETAL 3,218,667
APPARATUS FOR BLEEDING
Original Filed April 13, 1962 5 Sheets-Sheet 2
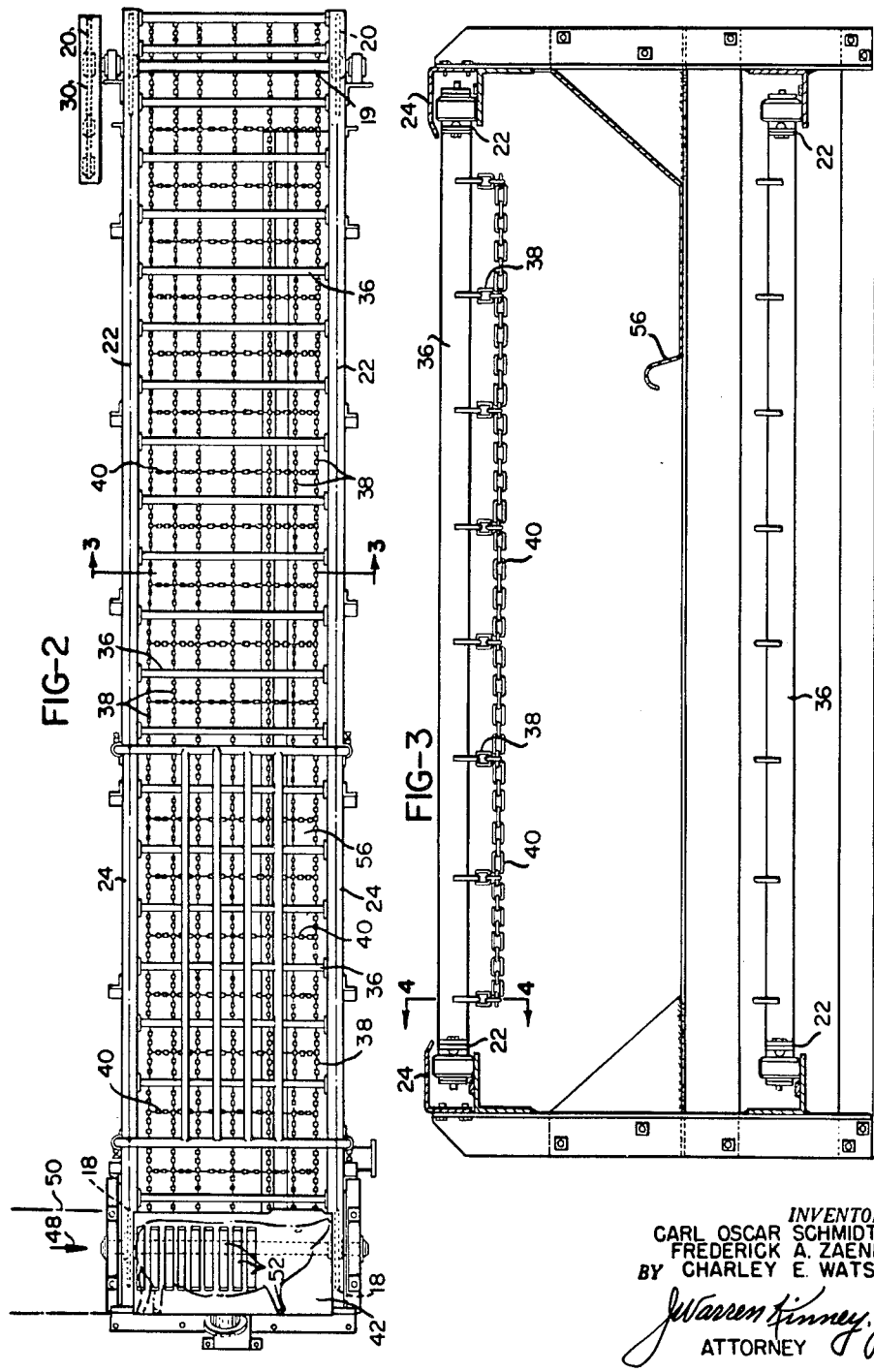
INVENTORS
CARL OSCAR SCHMIDT JR
FREDERICK A. ZAENKERT
CHARLEY E. WATSON
BY
ATTORNEY

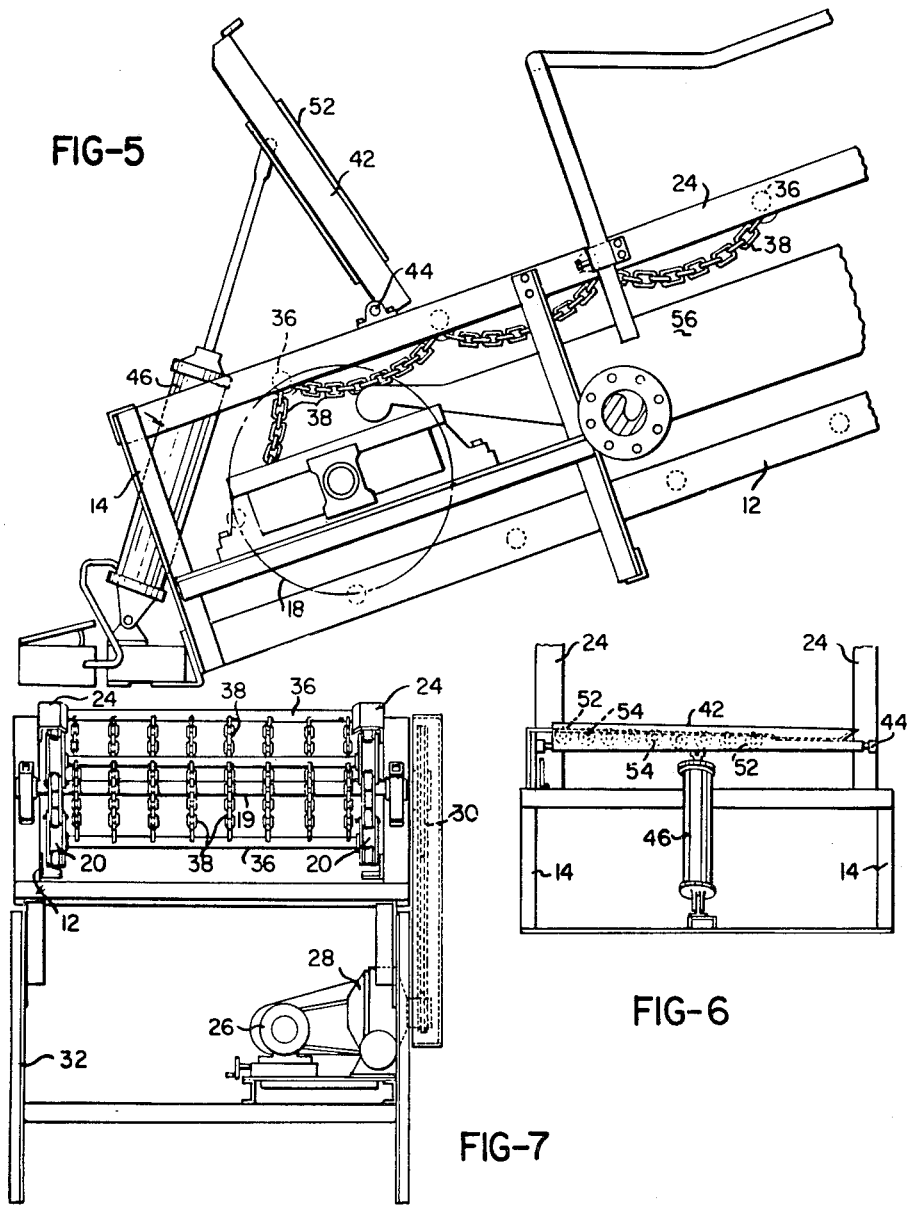

Nov. 23, 1965  C. O. SCHMIDT, JR., ET AL  3,218,667
APPARATUS FOR BLEEDING
Original Filed April 13, 1962  5 Sheets-Sheet 5

INVENTORS
CARL OSCAR SCHMIDT, JR.
FREDERICK A. ZAENKERT
BY CHARLEY E. WATSON

ATTORNEY

United States Patent Office 3,218,667
Patented Nov. 23, 1965

3,218,667
APPARATUS FOR BLEEDING
Carl Oscar Schmidt, Jr., Cincinnati, Frederick A. Zaenkert, Greenhills, and Charley E. Watson, Cincinnati, Ohio, assignors to The Cincinnati Butchers' Supply Company, Cincinnati, Ohio, a corporation of Ohio
Original application Apr. 13, 1962, Ser. No. 187,764, now Patent No. 3,127,635, dated Apr. 7, 1964. Divided and this application Dec. 23, 1963, Ser. No. 341,473
6 Claims. (Cl. 17—24)

This application is a division of application Serial No. 187,764, filed April 13, 1962, now Patent 3,127,635.

The present invention relates to apparatus for the bleeding of meat animals incident to slaughtering.

An object of the invention is to facilitate and expedite the slaughtering of meat animals, and to promote thorough bleeding of the animals following the sticking operation.

Another object is to provide improved means of a convenient and effective nature, for the bleeding of meat animals on a production basis, with resultant savings of labor and space in the abattoir.

A further object is to provide apparatus to facilitate the slaughtering procedure in such manner as to produce meat which is unblemished and of high quality.

The foregoing and other objects are attained by the means described herein and illustrated upon the accompanying drawings, in which:

FIG. 1 is a side elevational view of a bleeding conveyor embodying the teachings of the present invention.

FIG. 2 is a top plan view of the apparatus of FIG. 1.

FIG. 3 is a sectional view, on an enlarged scale taken on line 3—3 of FIG. 2.

FIG. 4 is a view, on an enlarged scale taken on line 4—4 of FIG. 3.

FIG. 5 is an enlarged view of the loading end of the apparatus of FIG. 1 showing the sticking platform in an elevated, animal-discharging position.

FIG. 6 is an enlarged plan view of the left end of the apparatus of FIG. 1.

FIG. 7 is an enlarged plan view of the right end of the apparatus of FIG. 1.

Figure 8:
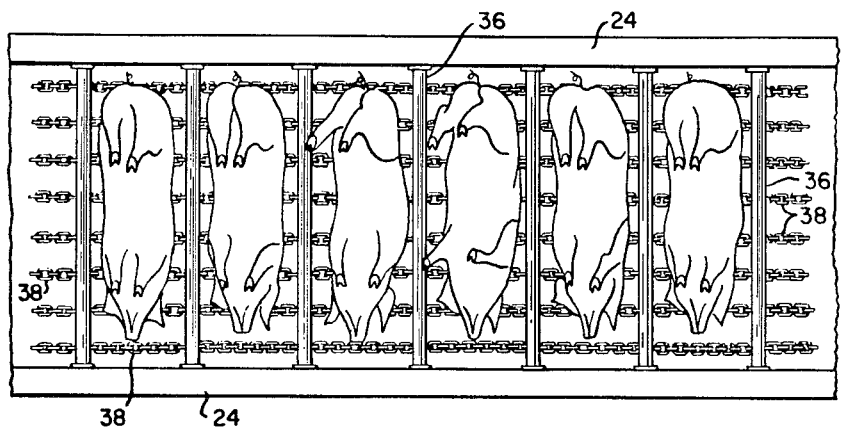
FIG. 8 is a top plan view showing a plurality of meat animals in the process of being bled according to the teachings of the present invention.
Figure 9:
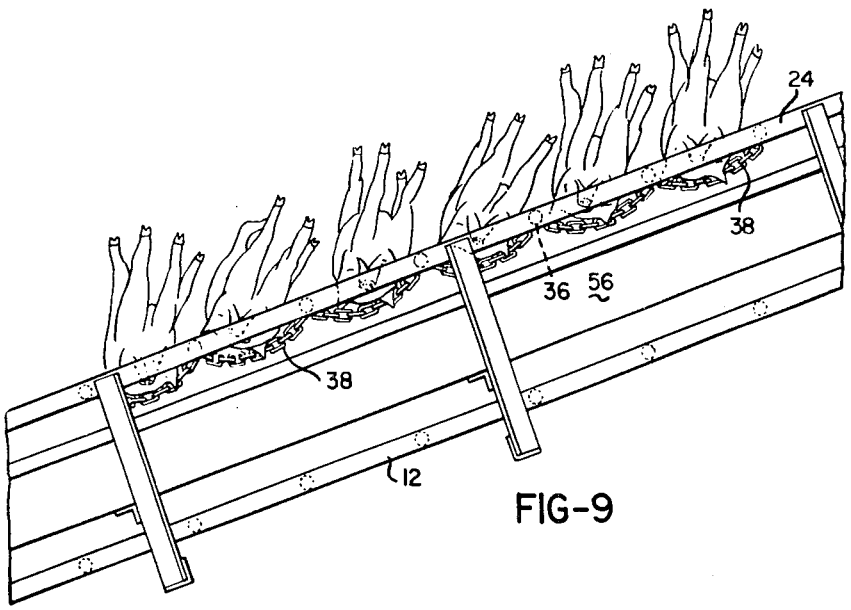
FIG. 9 is a side elevation of FIG. 8.

In accordance with the present invention, an animal to be slaughtered and whose involuntary processes have been initially immobilized is suitably deposited upon a sticking platform in position on its side where it is then stuck to initiate the bleeding. Thereupon the sticking platform, with the stuck animal thereon, is tilted so as to turn or roll the animal on its back and place it, feet upward, upon a moving conveyor which carries the animal until bleeding has been accomplished. The conveyor then releases the bled animal to a subsequent processing operation normal in the industry.

During the entire bleeding period, the animal is supported upon the bleeding conveyor with its feet uppermost, and with the head positioned so as to keep the neck wound open by allowing the head to sag or dangle from the body as the conveyor carries the animal away from the sticking platform. Thorough bleeding is thereby assured without brusing or otherwise depreciating the quality of the meat. The procedure outlined above assures also a saving of time and labor on the part of the sticker, as neither he nor an assistant is ever required to arrange the animal for proper disposition upon the sticking platform or the bleeding conveyor.

With reference now to the accompanying drawings, 12 indicates a conveyor frame preferably inclined as shown, with the receiving end 14 at a lower elevation than the discharge end 16. At the opposite ends of the frame are pairs of rotary sprockets 18 and 20 over which are trained spaced parallel conveyor chains 22 guided in channels 24 of the frame, for continuous travel from end to end of the frame. The pair of sprockets 20 is driven by suitable power means, such as an electric motor 26 and a speed reducer 28 transmitting rotation to the shaft 19 of sprocket 20, through the agency of belt or chain 30. The power means may be mounted, along with the discharge end of the conveyor, upon a stationary stand or sub-frame 32. One or more intermediate stands such as 34 may be provided for adequately supporting the frame 12 intermediate its ends.

The conveyor chains at opposite sides of the main frame carry a succession of rigid cross bars 36, which are secured at their opposite ends to the chains so as to travel with the chains at all times. The cross bars are equally spaced apart, and extend substantially at right angles to the line of travel of the conveyor chains.

From one cross bar 36 to the next, flexible suspenders 38 span the bars thereby to form with the bars a succession of cradles 37 each capable of supporting a meat animal lying on its back. The flexible suspenders 38 may be in the form of link chains as shown, hanging loosely between adjacent cross bars 36 so as to produce a cradle of limited depth. If considered necessary or desirable, the suspenders 38 may be stabilized against undue separation, by connecting them to a stabilizer element 40 which may be in the form of a transverse link chain as shown. The chain element 40 may be fixed to each suspender 38 which crosses it, thereby to maintain a condition of substantial parallelism between all the suspenders of a cradle.

Due to the flexible nature of the cradles, the cradles will follow successively around the sprockets at the opposite ends of the conveyor frame as the conveyor is driven by motor 26. That is, the cradles pass readily from the upper reach of the conveyor to the lower reach thereof, and vice versa, as the conveyor is continuously driven in one direction.

At the receiving end 14 of the conveyor frame is located the sticking platform 42, which may be in the form of a rigid member or plate hinged as at 44 upon the frame for upward tilting movement in the direction of the discharge end of the conveyor. The platform may be tilted toward upright position by power means, one form of which is shown as a double-acting air or hydraulic cylinder 46 to be controlled by the sticker or an assistant stationed at the sticking platform. In its normal home position, the platform 42 is substantially horizontal, as in FIGS. 1, 2 and 6.

The length of platform 42 may approximate the width of the conveyor frame, and its line of hinging is transverse to the frame. Accordingly, when a stunned animal, on its side is directed onto the platform, in the direction of arrow 48, FIG. 2, the platform may be activated by power means 46 to dump the animal into one of the cradles of the conveyor, with the animal landing in the cradle on its back and with its feet uppermost. The sticking of the animal is performed upon the platform, prior to tilting of the platform to dumping position. Bleeding of the animal occurs on the platform and during transport from the platform to the discharge end 16 of the conveyor, whence it is released for further processing.

In a typical installation, animals in stunned or immobilized condition are slid in succession head-first and on their sides onto the sticking platform, from an inclined chute 50 which is aligned with the platform at one side of the conveyor frame. To aid movement of the animal onto the platform, the platform may be equipped with a brace of freely rotatable conveyor rolls 52 arranged on spaced parallel roll shafts 54 supported transversely of the platform.

Blood from the stuck animals may be collected in a trough 56 suspended from the conveyor frame and extending lengthwise thereof. The blood trough has an open top which is disposed beneath the upper run of the conveyor, in position to catch the blood from the necks of the animals advanced by the conveyor. The trough may extend the full length of the conveyor frame if necessary or desirable. As shown in the exemplification of the drawings, the trough ends at 58, near the discharge terminal of the conveyor. The width of the trough may be limited to the area in which blood from the animal drops through the cradle.

In accordance with the present invention, animals in immobilized condition arrive upon the sticking platform on their sides, are then stuck and thereafter deposited upon their backs in the cradles of the conveyor. Bleeding progresses while the animals are transported upon their backs, with their heads supported at a level substantially in the support level of their respective bodies or with their heads hanging practically unsupported and away from the breast to keep the wound open throughout the bleeding period. The animals thoroughly bled are finally delivered from the discharge end of the bleeding conveyor.

With particular reference now to FIGS. 8–9 and 10–11, it should be understood that whereas portions of the body-supporting suspenders 38' are disposed beneath the heads of the stuck animals of the various or respective cradles defined by said suspenders, the heads of said animals nevertheless hang from their respective bodies since the heads are actually out of contact with elements 38' and therefore unsupported and hanging away from their respective breasts whereby to maintain the neck-wound in an open condition for facilitating free bleeding of the animal while being conveyed as illustrated in said figures.

Figure 10:
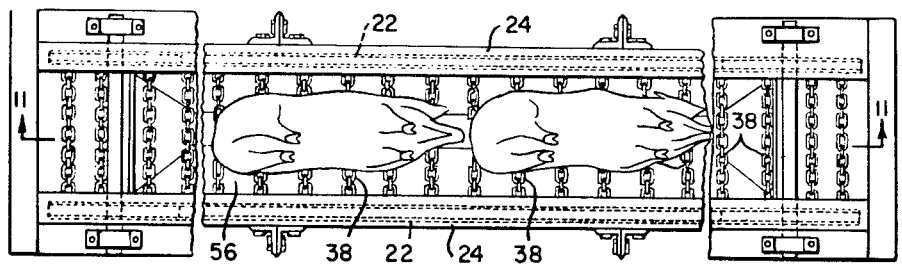
FIG. 10 is a top plan view of a plurality of meat animals in the process of being bled according to the teachings of the invention, while being supported in the cradles with their bodies extending lengthwise of their path of travel.
Figure 11:
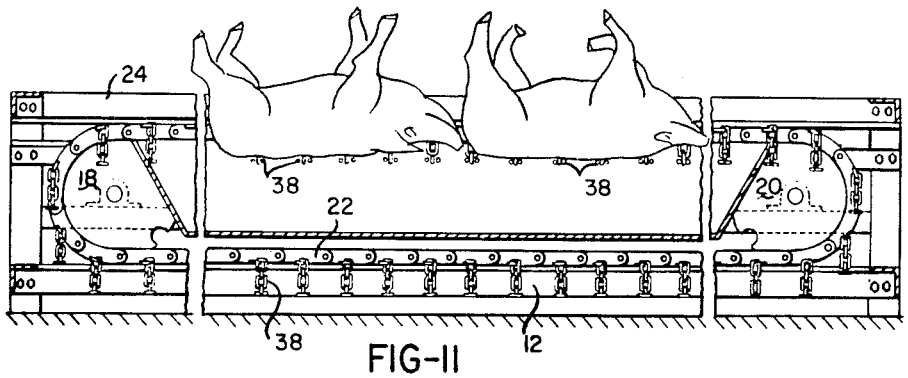
FIG. 11 is a view taken on line 11—11 of FIG. 10.
Figure 12:
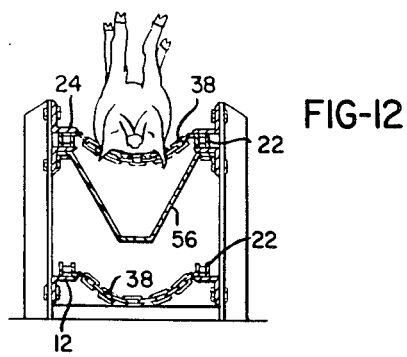
FIG. 12 is a view taken on line 12—12 of FIG. 11.

In the modified construction of the apparatus illustrated in FIGS. 10, 11 and 12 it will be readily apparent that substantially all of the elements illustrated in the preceding figures are embodied in the structure in a slightly altered arrangement whereby the bodies of the animals will be carried in end to end relation one with the other rather than in side by side relation and the suspenders or suspension chains, designated 38', extend transversely of the channels 24' and are attached at their ends to the chains 22', to form between the chains 22', the animal body supporting cradles 37', which cradles are clearly illustrated in FIG. 12.

The conveyor frame 12' carries the sprockets 18' and 20' at its ends as shown in FIG. 11 for supporting the chains 22'.

In the modified construction referred to, it will be seen that the cross bars 36 are not employed or necessary since the suspenders 38' extend transversely of the path of travel of the bodies, as shown and stated.

It is to be understood that various modifications and changes may be made in the structural details of the apparatus disclosed, within the scope of the appended claims, without departing from the spirit of the invention.

What is claimed is:
1. Apparatus for the processing of meat animals, which comprises in combination a bleeding conveyor including a series of movable cradles each adapted to support the body of an animal stuck to produce bleeding at the neck, a tiltable platform having a forward discharge edge and arranged to receive stunned animals on their sides and to deliver the animals across said edge to an underlying cradle of the conveyor, and means for elevating the platform to an inclined position in which it forms an obtuse angle with the conveyor therebeneath to overturn the body of the animal for deposit in a cradle in a quarter-turned position and upon its back with the legs of the animal uppermost and the head hanging away from the rest of the animal.

2. The invention as defined by claim 1 wherein said means for elevating the platform comprises a hydraulic cylinder motor supported below the platform and operatively coupled with the platform to apply elevating force to the rearward side thereof.

3. Apparatus for the processing of meat animals, which comprises in combination, a bleeding conveyor including a receiving end and a discharge end, means supporting the conveyor, a series of flexible cradles on said conveyor to receive and support the body of an animal stuck to produce bleeding at the neck, a platform disposed above the receiving end of the conveyor, the platform having a forward discharge edge, means pivotally supporting the platform for swinging on an axis parallel with and adjacent to said discharge edge, and means for swinging the platform on said axis to an upward tilted position in which said edge is directed downward toward an underlying cradle, to slidingly discharge the animal across said edge and into said underlying cradle and on its back.

4. The combination as set forth in claim 3, wherein said pivot support means is carried on the conveyor structure.

5. The invention according to claim 1, wherein said conveyor comprises spaced parallel endless chains, cross bars connecting the chains and spaced apart in the longitudinal direction of the conveyor, and each of said cradles consists of a plurality of short suspension chains extending in the longitudinal direction of the conveyor and in spaced parallel relation transversely of the conveyor and connected between and suspended in hanging loops from said cross bars.

6. The invention according to claim 1, wherein said conveyor comprises spaced parallel endless chains, and wherein said cradles are formed by short suspender chains extending transversely of the conveyor structure between and attached at their ends to said endless chains and spaced apart in the longitudinal direction of the conveyor structure.

References Cited by the Examiner
UNITED STATES PATENTS

| 699,690 | 5/1902 | Leetham | 214—16 |
| 3,076,996 | 2/1963 | Schmidt | 17—1 |

FOREIGN PATENTS

| 135,398 | 1/1961 | U.S.S.R. |

SAMUEL KOREN, *Primary Examiner.*

LUCIE H. LAUDENSLAGER, *Examiner.*